No. 609,084. Patented Aug. 16, 1898.
J. M. CULLEN.
NUT LOCK.
(Application filed Sept. 18, 1897.)
(No Model.)
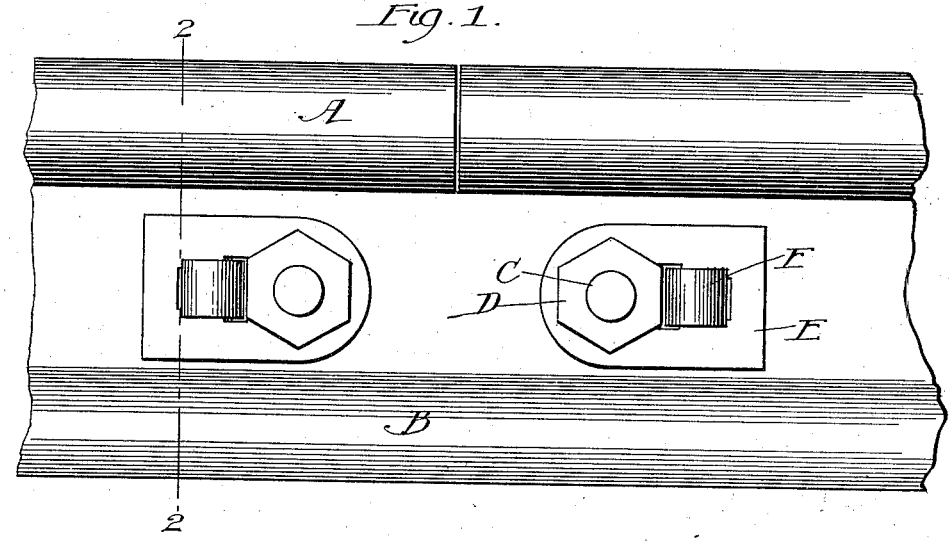
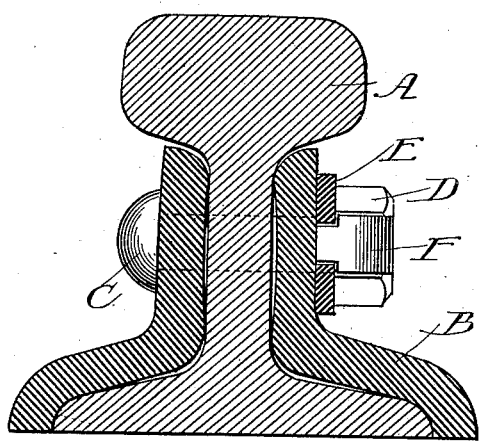
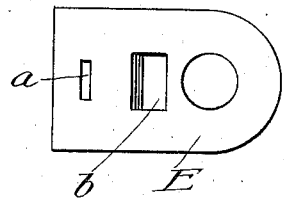
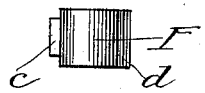
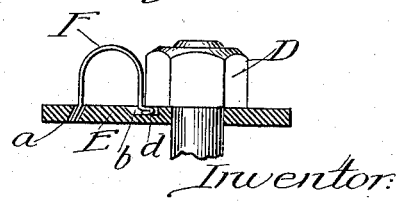
Witnesses:
Frank S. Blanchard
F. J. Le Moyne
Inventor:
John M. Cullen
By Louis V. Le Moyne
his Attorney
THE NORRIS PETERS CO., PHOTO-LITHO., WASHINGTON, D. C.

UNITED STATES PATENT OFFICE.

JOHN M. CULLEN, OF CHICAGO, ILLINOIS.

NUT-LOCK.

SPECIFICATION forming part of Letters Patent No. 609,084, dated August 16, 1898.

Application filed September 18, 1897. Serial No. 652,103. (No model.)

*To all whom it may concern:*

Be it known that I, JOHN M. CULLEN, a citizen of the United States, residing at Chicago, in the county of Cook, State of Illinois, have invented a new and useful Improvement in Nut-Locks, of which the following is a specification.

My invention belongs to that class of nut-locks in which a spring member is held in contact with a face of the nut to prevent its turning.

It consists of details hereinafter described, and particularly pointed out in the claim.

Figure 1 is a side elevation of a rail-joint, showing my nut-lock in position on the nuts. Fig. 2 is a sectional view on lines 2 2, Fig. 1. Fig. 3 is a detail view of the washer. Fig. 4 is a detail view of the spring. Fig. 5 is an elevation, partially in section, showing the spring in position against the face of the nut.

A represents the rail; B, the fish-plate; C, the bolt; D, the nut; E, the washer, and F the spring.

The washer E goes on the bolt C below the nut D. It has a slot $a$ and a recess $b$ in it. The spring F has a tongue $c$, which sets into the slot $a$, and a flange $d$, which sets into the recess $b$. This recess extends partially under the nut, as shown in Fig. 5, so that the nut forms a latch which the flange $d$ engages.

The operation of my invention is as follows: The washer E is put upon the bolt C, and the nut D is turned up until it is tight, and one face is turned toward the spring. The spring is then inserted, the tongue $c$ setting into the slot $a$ and forced down by compressing it until the flange $d$ slides under the nut into the recess $b$. In this position the spring is latched and cannot be disengaged by ordinary means, and the nut securely held against any loosening tendency.

If it is desired to remove the spring, it may be done by inserting a bar under the loop and prying it off.

The tongue $c$ and slot $a$ are inclined outward, as shown in Fig. 5, in order to prevent the tongue from coming out without considerable force or compression of the spring.

What I claim, and desire to secure by Letters Patent, is—

The herein-described nut-lock, consisting of the combination of the bolt C, the nut D, the washer E having the inclined slot $a$ therein and the recess $b$ therein extending under the head of the nut, the spring F, having the flange $d$ extending under the head of the nut and an upward-extending flat portion which engages the face of the nut and the tongue $c$ which sets into the slot $a$, all substantially as shown and described.

JOHN M. CULLEN.

Witnesses:
JOHN F. HOLLAND,
LOUIS V. LE MOYNE.